Feb. 7, 1950      E. MORGAN      2,496,593
BICYCLE STAND
Filed Dec. 23, 1946
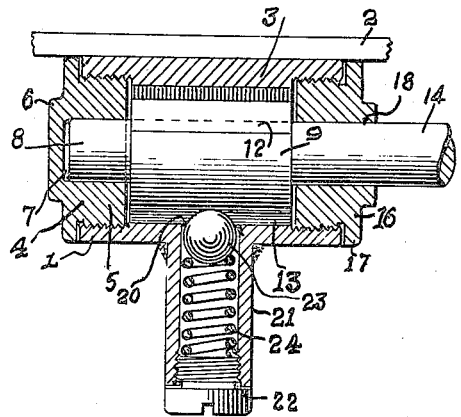
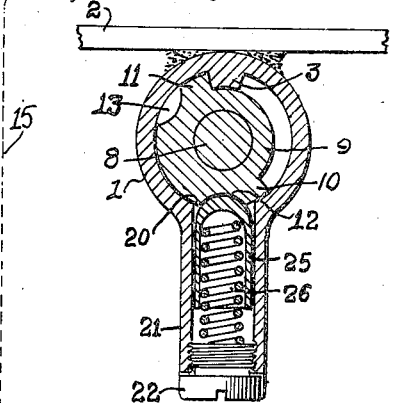
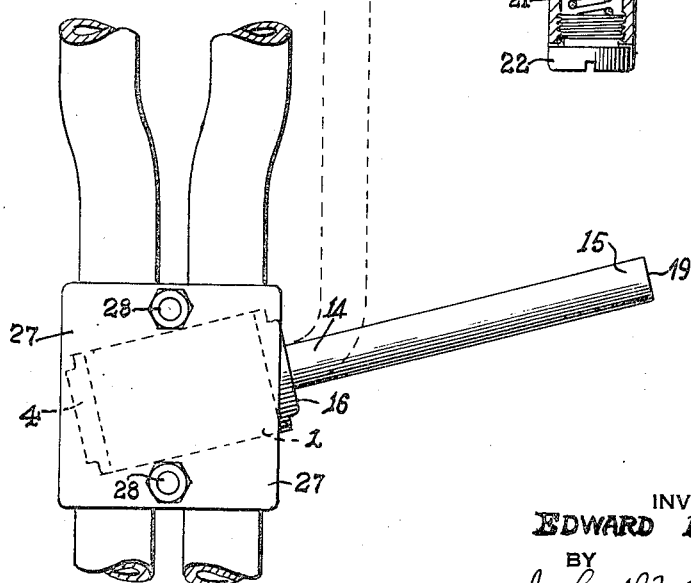
INVENTOR
EDWARD MORGAN
BY
John H. McLean
ATTORNEY Patented Feb. 7, 1950

2,496,593

UNITED STATES PATENT OFFICE 2,496,593

BICYCLE STAND

Edward Morgan, Dayton, Ohio

Application December 23, 1946, Serial No. 717,955

4 Claims. (Cl. 280—301)

This invention relates to improvements in stands for bicycles of the class termed "kick stands," due to the fact that it may be moved into or out of operated position by a kick of the user.

It is an object of this invention to provide a stand for bicycles, in which the operating or moving parts are securely enclosed, so that they are maintained in a well housed lubricated and protected condition.

It is also an object of this invention to provide a prop that may be held in either of two positions, and when in either position, it is not subject to be lightly and easily shifted. The weight of the bicycle tends to prevent the collapse of the prop.

It is also an object of this invention to provide a bicycle prop in which there is provided a positive stop, and a support for the bicycle; and in which there are no pins or similar objects that are likely to be cut off.

These and other advantages will appear in the following description taken in connection with the drawings.

Figure 1 is a longitudinal section through an enclosing cylinder showing a rotating cam and stop member within the cylinder and a spring operated ball for locking the cam and stop member in definite positions.

Figure 2 shows a view looking down on the stand attached to the bicycle frame. It also shows the supporting standard in two positions.

Figure 3 is a cross section through the cylinder and the operating parts showing a modified form of lock for the cam and stop member.

The numeral 1 is used to designate a body member which may be an enclosing housing in the form of a cylinder attached directly to the bicycle frame, or to a plate 2, which serves as a part of an attaching structure for the prop. The housing 1 is cylindrical in form and has formed on its interior a stop 3 integral with the structural material of the cylinder by welding or any other suitable means.

This stop 3 extends longitudinally of the cylinder. Each end of the cylinder is closed by a removable cap. One end is closed by means of a screw cap 4, which has a part 5 threaded into the end of the cylinder and a flange 6, engaging the outer surface of the end of the cylinder. This screw cap 4 has a socket 7 therein, which serves as a bearing for a spindle 8 rotatably mounted in the socket. On this spindle, adjacent the cap 4, is a rotor 9 in the form of a cam and stop member. This member 9 has thereon a stop 10 adapted, when in one position, to engage the stop 3 and support the bicycle. On this member 9 is a stop 11 adapted to engage the stop 3 when the member 9 is in another position and the stand is in inoperative position.

Adjacent to each of the stop members 10 and 11 is a cam groove. The cam groove adjacent the stop 10 is indicated by the numeral 12; the cam groove adjacent the stop 11 is indicated by the numeral 13.

The cam and stop member 9 is located on a shaft 14, which forms a part of a supporting prop or sprag 15. The spindle 8 is a part of the shaft 14, which is supported in the end of the cylinder by the means of a screw cap 16, threaded into the end of the cylinder. This cap is provided with a flange 17 engaging the outer end of the cylinder. This cap is provided with a hole 18 in which the shaft 14 fits and rotates. On the outer end of the prop or sprag is a foot 19 adapted to engage the ground for supporting the bicycle.

In one side of the cylinder is a hole 20. Attached to the cylinder around this hole is a ball housing 21, which is cylindrical in shape and may be welded or in any other manner, attached to the side of the cylinder 1. The free end of this housing 21 is provided with a screw cap 22. In the hole 20 is a ball 23 adapted to be forced into one of the cam grooves 12 and 13. This ball is urged inwardly with relation to cylinder 1 by means of a spring 24 located in the housing 21 between the cap 22 and the ball.

When the ball is in the cam groove 13, the stop 10 engages with a stop 3 on the inside of the cylinder 1, and the standard is supported in inoperative position. Whenever the ball is in a cam groove 12, the stop 11 engages the stop 3 and the prop 15 extends down to support the bicycle. The engagement of the stops 10 and 11 with the stop 3 serves as positive stops to prevent any further rotation of the cam structure within the cylinder, and while these stops engage each other, the ball fits within one of the cam grooves and prevents the movement of the stops 10 and 11 away from the stop 3, except on the application of considerable force to the prop 15.

In Figure 2 there is shown a cylinder 3, which with end caps 6 and 16 forms a housing for the rotor 9. This housing holds the rotor against longitudinal movement and is so formed that the rotor has not only no longitudinal movement but is securely sealed against the admission of foreign materials to the rotor.

In Figure 3 is shown a modified form, in which the ball 23 is replaced by a plunger 25, that is urged into the cam groove by means of a spring 26 similar to spring 24.

Cooperating with the plate 2 for the purpose of supporting the stand on the bicycle frame there is a plate 27. The plates 2 and 27 are clamped to the bicycle frame by means of bolts 28. Instead of the cylinder being attached to the plate 2, it may be welded directly to the frame.

What I claim is:

1. In a stand for bicycles, a cylinder, a rotor in said cylinder, said rotor being cut away to provide two stops, a stop in the cylinder between the two stops to limit the rotation of the rotor in the cylinder; and means on the cylinder to engage the rotor tending to hold the rotor against turning when the cylinder stop is adjacent either of the rotor stops.

2. In a stand for bicycles, a cylinder, a rotor in said cylinder, said rotor being cut away to provide two stops, a stop in the cylinder between the two stops to limit the rotation of the rotor in the cylinder; and means of the cylinder to engage the rotor tending to hold the rotor against turning when the cylinder stop is adjacent either of the rotor stops, said means comprising a pair of grooves in the rotor and a spring pressed ball in the cylinder.

3. In a bicycle prop, a cylindrical housing having in one end a cap with a socket therein and in its other end a cap with a hole therein, and a rotor in the cylinder, said rotor having on one end a spindle extending into the socket and on its other end a shaft extending through the hole, said rotor being cut away to form two stops and a stop in the cylinder between the rotor stops adapted to be engaged by the rotor stops to limit the rotation of the rotor, said housing so enclosing the rotor that no dirt or grit can reach the rotor.

4. In a bicycle prop, a cylindrical housing attached to the bicycle frame and having in one end a cap with a socket therein and in its other end a cap with a hole therein, each cap being removably mounted in the cylinder and engaging an end of the rotor, and a rotor in the cylinder, said rotor having on one end a spindle extending into the socket and on its other end a shaft extending into the hole, said shaft having thereon a diagonally extending prop member.

EDWARD MORGAN.

REFERENCES CITED

The following references are of record in the file of this patent:

UNITED STATES PATENTS

| Number | Name | Date |
|---|---|---|
| 1,435,625 | Schwinn | Nov. 14, 1922 |
| 1,531,325 | White | Mar. 31, 1925 |
| 2,197,936 | Kraeft | Apr. 23, 1940 |
| 2,395,148 | Schwinn | Feb. 19, 1946 |

FOREIGN PATENTS

| Number | Country | Date |
|---|---|---|
| 55,209 | Denmark | Sept. 12, 1938 |
| 100,814 | Sweden | Feb. 4, 1941 |